United States Patent [19]

Klein

[11] Patent Number: 4,749,822

[45] Date of Patent: Jun. 7, 1988

[54] SHIELDED BOOT FOR CABLE CONNECTOR

[75] Inventor: Laurence R. Klein, Torrance, Calif.

[73] Assignee: The Zippertubing Company, Los Angeles, Calif.

[21] Appl. No.: 881,790

[22] Filed: Jul. 3, 1986

[51] Int. Cl.⁴ .............................................. H02G 15/08
[52] U.S. Cl. ................................. 174/36; 174/35 C; 174/92; 174/DIG. 11
[58] Field of Search ..................... 174/35 C, 35 R, 36, 174/92, DIG. 11

[56] References Cited

U.S. PATENT DOCUMENTS

| | | | |
|---|---|---|---|
| 3,089,915 | 5/1963 | Plummer | 174/36 |
| 3,187,090 | 6/1965 | Edwards | 174/92 |
| 3,357,455 | 12/1967 | Plummer | 174/DIG. 11 X |
| 3,423,515 | 1/1969 | Eichberg | 174/36 |
| 3,455,336 | 7/1969 | Ellis | 174/DIG. 11 X |
| 3,467,761 | 9/1969 | Plummer | 174/36 |
| 3,495,026 | 2/1970 | Gillemot | 174/DIG. 11 X |
| 4,169,966 | 10/1979 | Casati | 174/92 |
| 4,409,427 | 10/1983 | Plummer, III | 174/36 |

Primary Examiner—Morris H. Nimmo
Attorney, Agent, or Firm—Christie, Parker & Hale

[57] ABSTRACT

Disclosed is a unitary shielded boot for assembly about a separable connector interconnecting a pair of multiple conductor shielded cables. The boot has a flexible plastic main body lined with conductive shielding and provided with a separable plastic seam lengthwise of its exterior. A shielded guard flap bridges the underside of the seam when closed and provides a highly effective externally insulated shielded enclosure for the separable cable connector. The opposite ends of the boot shield overlap a respective adjacent end of the cable shields and are electrically connective thereto.

10 Claims, 2 Drawing Sheets

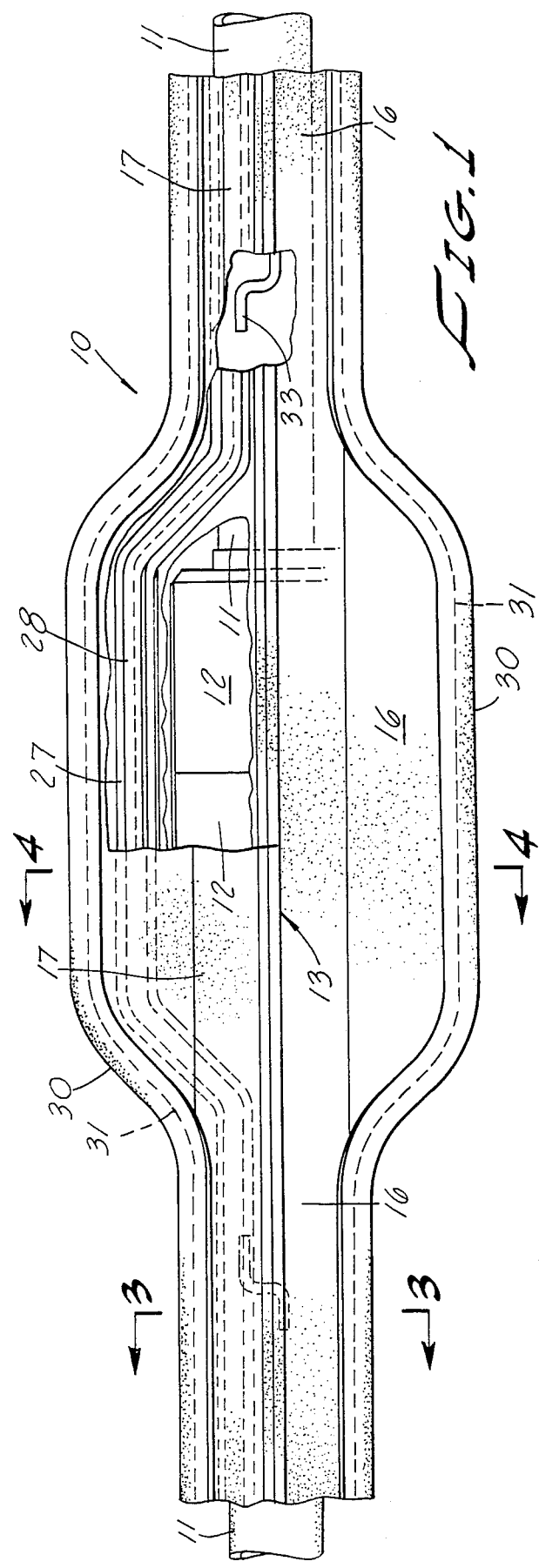
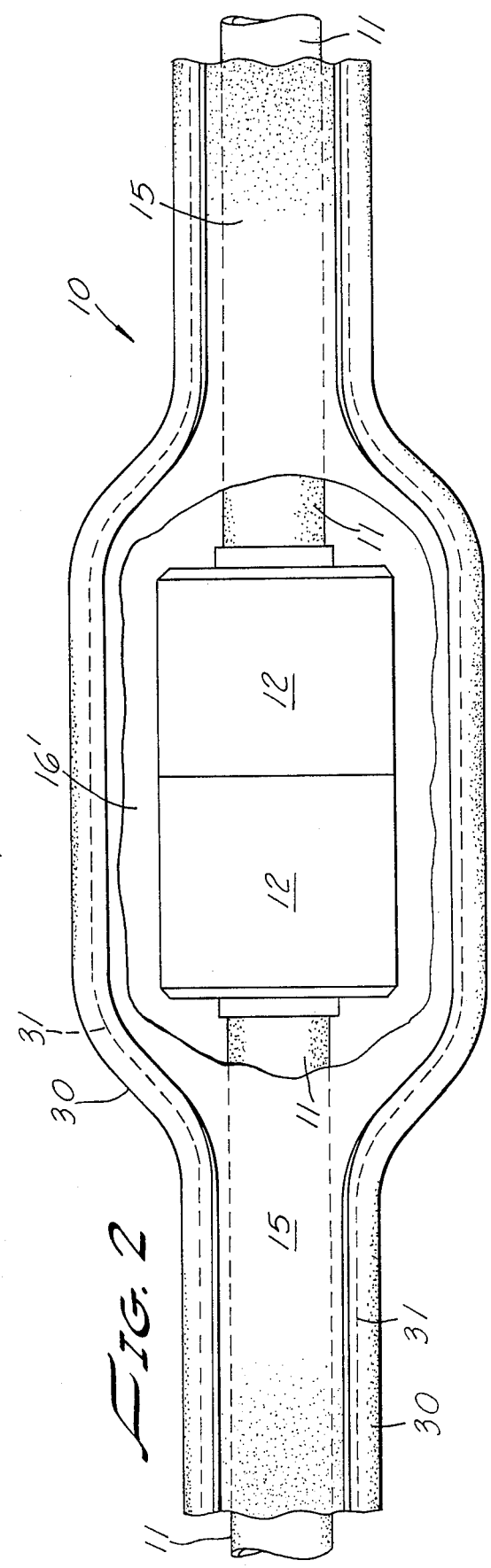

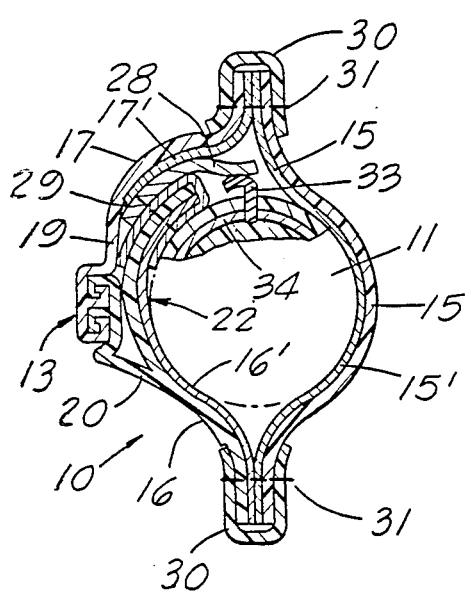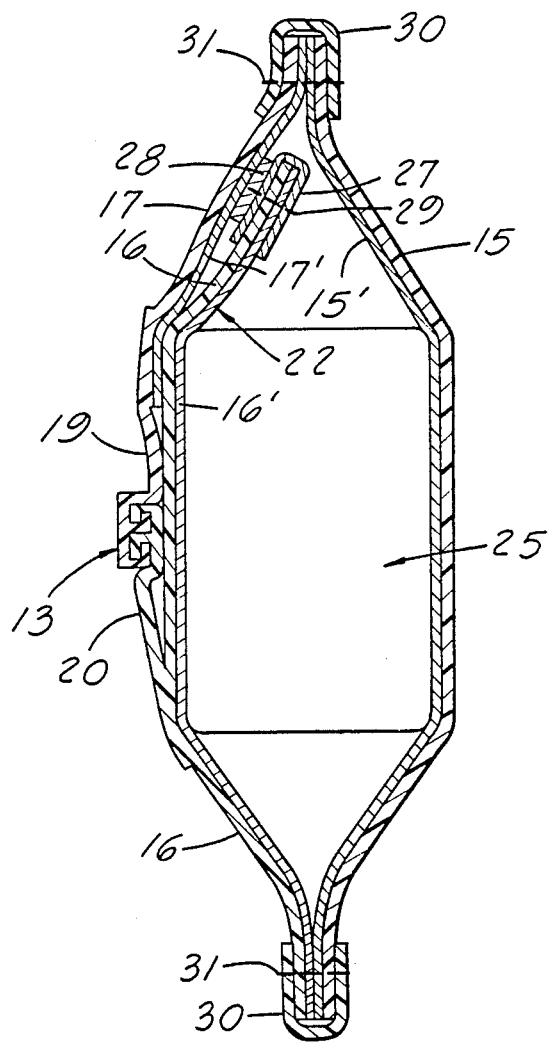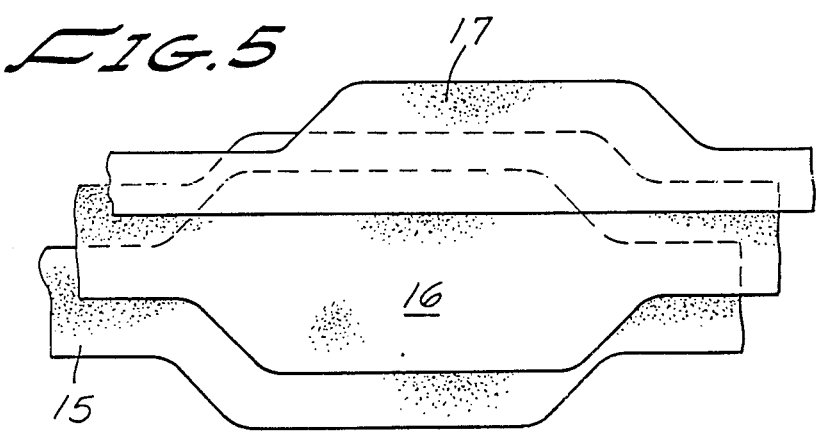

SHIELDED BOOT FOR CABLE CONNECTOR

BACKGROUND OF THE INVENTION

Many electrical components must be interconnected by shielded cables of insulated conductors equipped with separable connectors. Typically, such connectors are of larger cross section than that the cables and are without shielding with the result that the circuitry served by the cabling is exposed to extraneous electrical fields, static, etc. Neither is there satisfactory provision in the prior art for electrically interconnecting the shielding of cables to either side of the separable cable connector.

SUMMARY OF THE INVENTION

This invention provides a simple, highly effective, unitary shielded boot specially designed for expeditious assembly about a separable cable connectors attached to the adjacent ends of a pair of shielded cables. The tubular boot has a main body formed of sheet plastic lined on its interior side with electrical shielding and provided on its exterior with a separable interlocking seam. The midlength of the boot is suitably enlarged to snugly enclose the cable connector and its ends converge into a snug fit about a respective one of the cables. When the seam is open the assembled cabling connectors are insertable into the boot, the shielded guard flap is tucked across and underlies the seam members following which the seam is closed to provide a highly effective waterproof shielded enclosure for the connector. The boot shield includes a flexible grounding lead the opposite ends of which are connectable to the adjacent grounding lead of the two shielded cables. When the seam is open the connector assembly is exposed for separation, servicing and testing of individual conductors of the cabling.

Accordingly, it is a primary object of this invention to provide a unique and improved shielded boot for a separable connector between two shielded cables.

Another object of the invention is the provision of a unitary shielded tubular boot provided with a separable seam lengthwise thereof and having a shielded chamber in its midportion accommodating a separable electrical conductor for cabling.

Another object of the invention is the provision of a tubular shielded boot having an outer main body formed of sheet plastic lined internally with electrical shielding and provided with a separable access seam lengthwise of its exterior overlying and bridging a shielded guard flap.

These and other more specific objects will appear upon reading the following specification and claims and upon considering in connection therewith the attached drawing to which they relate.

Referring now to the drawing in which a preferred embodiment of the invention is illustrated:

FIG. 1 is a longitudinal view of the front or seam-equipped side of an illustrative embodiment of the invention shielding boot assembled about a connector separably interconnecting two cables with a portion of the boot wall broken away to show one end of the boot grounding lead connected to one of the cable shields;

FIG. 2 is a plan view of the rear side of the boot shown in FIG. 1 with a portion of the boot sidewall broken away to show the electrical connector;

FIG. 3 is a cross sectional view on an enlarged scale taken along line 3—3 on FIG. 1;

FIG. 4 is a cross sectional view on an enlarged scale taken along line 4—4 on FIG. 1; and FIG. 5 is an exploded plan view of the three plaques forming the main body of the boot.

Referring to FIG. 1 there is shown an illustrative embodiment of the shielded boot designated generally 10, assembled about a pair of shielded electrical cables 11, 11 interconnected by a conventional separable connector 12. Extending lengthwise of the front side of the boot is a separable seam 13 which can be closed and reopened for assembly and future servicing operations.

As is best shown in FIGS. 4 and 5, the boot is formed of three plaques of flexible impervious sheet material such as plastic and includes a rear plaque 15 and a pair of dissimilar front plaques 16 and 17. These plaques differ somewhat in contour as is best shown in FIG. 5 wherein the three plaques 15, 16 and 17 are shown in superimposed relation to one another. The electrical shielding for the boot is formed of three plaques of conductive material such as aluminum foil 15', 16' and 17' of the same size and shape as the related main body plaques. The shielding plaques are assembled against the inwardly facing sides of the main body plaques and are secured together to form the boot as will be explained presently.

Prior to the assembly of the plaques to form the boot, the two front members 16 and 17 are provided with the separable seam 13. This seam consists of a pair of separable interlocking plastic seam members 19 and 20 well known to persons in this art and having their mounting webs heat fused or otherwise secured to the front plaques 16 and 17. Seam member 20 is secured lengthwise of plaque 16 along a portion spaced very substantially inwardly from the non-linear edge thereof to provide a wide guard flap 22, adapted to under lie and bridge the separable seam assembly 13 when the boot is in its fully assembled condition about a separable cable connector. As seen best in FIGS. 4 and 5, the inner one of the front plaques 16 is wider in the midportion of the boot that encompasses a connector 25 than in the narrower end portions where the boot fits around the electrical cables 11. Both edges of this plaque 16 are generally complemental in shape with the near plaque 15.

As is made particularly clear by FIG. 5, the boot plaques 15, 16 and 17 are tailored to provide a boot having a relatively wide large-capacity midportion which converges towards the opposite ends of the boot to provide end portions of substantially smaller widths. Thus, these several portions of the plaques are proportioned to provide a central chamber sufficiently large to compactly enclose the two parts of a separable cable connector 12 or 25 and the opposite ends of the boot are tailored to snugly embrace portions of shielded cabling downstream from connector 25.

Preparatory to assembly of the plaques, the free lateral edge of guard flap 22 is preferably embraced by a strip of foil or other conductive material 27 (FIG. 4) secured to the guard flap along with a flexible strip of conductive grounding material 28 as by stitching 29. The grounding conductor 28 is secured to the outwardly facing side of the guard flap so as to be held in contact with the adjacent plaque of shielding material 17' when the boot is assembled about cabling.

The assembly of the boot plaques is performed by placing the front plaques 16 and 17 and their shielding layer against the rear plaques 15 and 15' with their remote lateral edges in registry with one another. Each of these lateral edges is then preferably embraced by a suitable strip of binder material 30, 30 secured in place assembled condition as by stitching 31.

Assembly of the shielding boot 10 to cabling is a simple operation. The members of the separable seam 13 of any suitable type, such as that illustrated having interlocking tongues and grooves, is opened in order that the front cover flaps 16 and 17 can be expanded to receive the shielded cables 11, 11 each equipped with separable coupling halves such as indicated at 12 in FIG. 2 or the rectangular type typically employed with ribbon cables and indicated at 25 in FIG. 4. The opposite ends of the boot grounding conductor 28 are then soldered or otherwise connected to a respective one of the grounding leads 33 of the cable shield 34 (FIG. 3). Thereafter the guard flap 22 of the boot is pressed firmly against the cables and the connector 12 or 25. Seam 13 is then closed to hold the boot snugly assembled about the cable junction. The conductive linging 15', 16', 17' then completely and snugly embraces both the cable ends and the cable connector and cooperates with the shielding of the cables to provide a complete and gapless electrical shield for the entire assembly. As best seen in FIG. 4, the conductive lining 16' on the guard flap 22 extends beyond the seam 13 and the strip conductive grounding material 28 along the edge of the guard flap remains in contact with the conductive lining inside the other front plaque 17, assuring a gapless electrical shield for the connector 25 within the boot.

While the particular shielded boot for cable connector herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. An elongated shielded tubular boot adapted to be assembled about a separate electrical connector formed in two halves each connected to the adjacent ends of a pair of aligned cables comprising:
    a flattened tubular main body split lengthwise thereof and formed from three flat plaques of impervious sheet plastic, each of the plaques having a relatively large midportion and relatively smaller opposite ends;
    means securing said three main body plaques together in face to face engagement along the opposite lateral edges of said boot;
    a pair of separable interlocking seam members on a respective pair of said plaques for closing said slit and extending lengthwise of said main body and overlying a guard flap integral with one of said plaques and bridging the interior side of said seam members when closed; and
    a lining of electrically conductive shielding laminated on the interior side of the plaques forming said main body and said guard flap, the guard flap being sufficiently wider in its midportion than its end portions to extend a sufficient distance towards an opposite lateral edge in the midportion of the boot to provide a gapless electrical shield for an electrical connector inside the boot.

2. A shielded tubular boot as defined in claim 1 characterized in the provision of a flexible grounding conductor secured to said conductive shielding and extending from end to end of said boot.

3. A shielded boot as defined in claim 1 wherein the guard flap extends a sufficient distance towards an opposite lateral edge in the midportion of the boot to provide a gapless electrical shield for an electrical connector inside the boot.

4. An elongated shielded tubular boot adapted to be assembled about a separate electrical connector formed in two halves each connected to the adjacent ends of a pair of aligned cables comprising:
    a flattened tubular main body split lengthwise thereof and formed from three flat plaques of impervious sheet plastic, each of the plaques having a relatively large midportion and relatively smaller opposite ends;
    means securing said three main body plaques together in face to face engagement along the opposite lateral edges of said boot, the opposite lateral edges of said main body being embraced by separate strips of binding material held assembled thereto by said securing means for said laminated main body plaques;
    a pair of separable interlocking seam members on a respective pair of said plaques for closing said slit and extending lengthwise of said main body and overlying a guard flap integral with one of said plaques and bridging the interior side of said seam members when closed; and
    a lining of electrically conductive shielding laminated on the interior side of the plaques forming said main body and said guard flap.

5. A unitary shielded tubular boot for enclosing the ends of a pair of shielded electrical cables having their adjacent ends equipped with a separable connector device comprising:
    a first front and a single rear plaque of sheet plastic each covered on one side with conductive shielding and in which each plaque had a relatively wide midlength portion converging into relatively narrower opposite end portions, both lateral edges of the first front plaque being generally complemental in shape to the lateral edges of said rear plaque;
    a second front plaque of sheet plastic covered on one side with conductive shielding and having one straight lateral edge and a second lateral edge generally complemental in shape to the other lateral edge of said rear plaque;
    all of said plaques being superimposed with said shielding innermost and with the wide midportion of said rear plaque in registry with the complemental edges of said front plaques;
    means securing together one complemental lateral edges of each of said superimposed plaques so that the assembled boot is flat and leaving the other complemental edge of the first front plaque unsecured for forming an internal guard flap;
    conductive means along the unsecured guard flap edge of the first plaque for making electrical contact between the shielding on the first front plaque and the shielding on the second front plaque for forming a gapless enclosure for a connector; and
    a pair of separable interlocking plastic seam members secured lengthwise of respective ones of said front plaques of sheet plastic to hold the front plaques separably closed in overlapping relation to one another.

6. A shielded boot as defined in claim 5 characterized in that the complemental lateral edges of said superimposed plaques are embraced by respective strips of supple sheet plastic held in place by said means securing said superimposed plaques together.

7. A shielded boot as defined in claim 5 characterized in that both front plaques and the rear plaque of laminated sheet plastic and shielding are adapted to lie collapsed and against one another prior to the assembly of said boot about a pair of separable connector equipped cables.

8. A shielded boot as defined in claim 6 characterized in that the opposite ends of said boot are adapted to embrace portions of shielded cable adjacent a separable cable connector and to conceal therebeneath a grounding connection between said boot shielding and the shielding of a shielded cable connectable to said separable connector.

9. An elongated boot for removably electrically shielding a pair of separable electrical connector halves each connected to an electrical cable comprising:

an elongated rear plaque of sheet plastic having a conductive lining laminated on the inside face of the plastic, and having a relatively wide midportion and relatively narrow end portions;

an inner front plaque of sheet plastic having a conductive lining laminated on the inside face of the plastic, one edge of the inner front plaque being substantially complemental with one edge of the rear plaque;

an outer front plaque of sheet plastic having a conductive lining laminated on the inside face of the plastic, one edge of the inner front plaque being substantially complemental with the other edge of the rear plaque, and the opposite edge being straight;

means for securing the complemental edges of the inner and outer front plaques to the respective complemental edges of the rear plaque with the conductive linings in electrical contact;

a pair of separable seam members extending lengthwise on the inside of the outer front plaque along the straight edge and on the outside of the inner front plaque, respectively, for interlocking and closing the boot lengthwise thereof;

a guard flap integral with the inner front plaque and extending beyond the seam member thereon toward the complemental edge of the outer front plaque, the guard flap being wider in the relatively wide midportion of the boot than in the relatively narrow end portions and having a conductive lining laminated on the inside face thereof; and a flexible grounding conductor on at least an edge portion of the outside of the guard flap and electrically connected to the conductive lining thereof.

10. A boot as defined in claim 9 wherein the means for securing the edges of the plaques comprises a strip of binding material embracing the complemental edges of the plaques, and stitching securing the strip of binding material and plaques together.

* * * * *